United States Patent [19]

Szycher

[11] 4,447,590
[45] May 8, 1984

[54] EXTRUDABLE POLYURETHANE FOR PROSTHETIC DEVICES PREPARED FROM A DIISOCYANATE, A POLYTETRAMETHYLENE ETHER POLYOL AND 1,4 BUTANE DIOL

[75] Inventor: Michael Szycher, Lynnfield, Mass.

[73] Assignee: Thermo Electron Corporation, Waltham, Mass.

[21] Appl. No.: 479,922

[22] Filed: Apr. 4, 1983

Related U.S. Application Data

[63] Continuation of Ser. No. 316,922, Oct. 30, 1981, abandoned.

[51] Int. Cl.$^3$ ............................................ C08G 18/32
[52] U.S. Cl. ...................................................... 528/76
[58] Field of Search ........................................ 528/76

[56] References Cited

U.S. PATENT DOCUMENTS 2,899,411  8/1959  Schollenberger ..................... 528/76
4,131,604  12/1978  Szycher ................................ 528/79

FOREIGN PATENT DOCUMENTS

| 980435 | 10/1961 | United Kingdom . |
| 1075467 | 6/1964 | United Kingdom . |
| 1240116 | 6/1968 | United Kingdom . |
| 1351773 | 7/1971 | United Kingdom . |
| 1351774 | 7/1971 | United Kingdom . |
| 1529319 | 12/1975 | United Kingdom . |
| 2024233A | 7/1979 | United Kingdom . |

Primary Examiner—Maurice J. Welsh
Attorney, Agent, or Firm—Kenway & Jenney

[57] ABSTRACT

Reaction product of an aliphatic organic diisocyanate, a high molecular weight polyether polyol (poly tetra methylene ether glycol) and 1,4 butane diol. The resulting polymers have thromboresistant properties, a long flexural life and are extrudable. The polyurethane polymer is ideal for forming transvenous cardiac pacemaker leads, blood bags, intravenous and intra-arterial catheters and tubing, and other shaped devices which must be formed of a blood compatible material.

1 Claim, 1 Drawing Figure

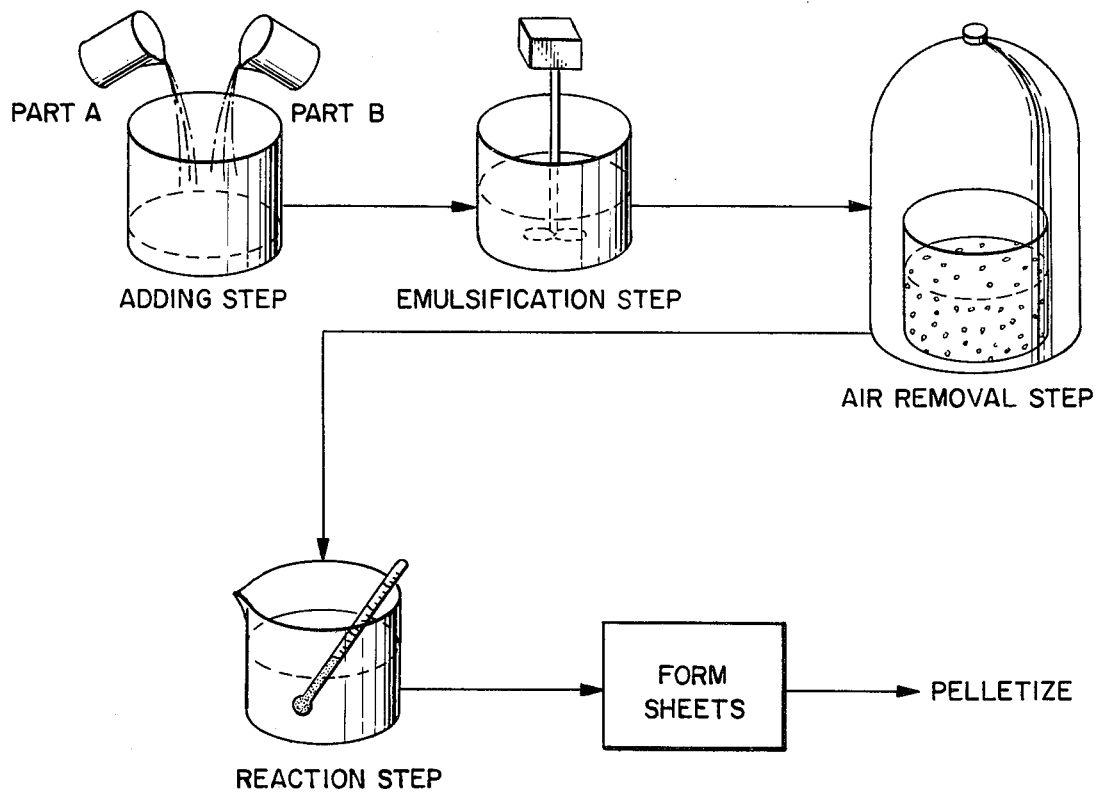

EXTRUDABLE POLYURETHANE FOR PROSTHETIC DEVICES PREPARED FROM A DIISOCYANATE, A POLYTETRAMETHYLENE ETHER POLYOL AND 1,4 BUTANE DIOL

REFERENCE TO RELATED APPLICATION

This application is a continuation of prior application Ser. No. 316,922 filed on Oct. 30, 1981 of Michael Szycher entitled "Extrudable Polyurethane for Prosthetic Devices", now abandoned.

BACKGROUND OF THE INVENTION

Significant advances have been made in recent years in development of vascular prosthesis. For example, U.S. Pat. No. 4,131,604 to Szycher entitled Polyurethane Elastomer For Heart Assist Devices discloses a family of polyurethanes with excellent properties which can be used to form moldable prosthetic devices. One deficiency of the polyurethane disclosed in that patent however is that those polyurethanes are not extrudable. There are many prosthetic devices as well as other devices, which must be blood compatible which can only be manufactured efficiently by extrusion or blow molding.

It should be apparent that devices such as pacemaker leads, blood bags, catheters, and I.V. tubing must be formed of a material that meets a number of criteria. The most significant criteria is that the material from which such devices are fabricated must be hemocompatible. That is, the material should not induce the formation of a thrombus which can embolize into the peripheral bloodstream. Of course, the material must be nontoxic. In addition to the foregoing, it is desirable that materials for devices to be used in manufacturing vascular prothesis possess a high degree of resiliency, strength and an ability to flex without breakage. As is mentioned above for the formation of certain devices, it is desirable that the material be extrudable.

SUMMARY OF THE INVENTION

This invention relates to a family of extrudable polyurethane polymers specifically developed for use in devices that require a high degree of blood compatibility. The polymers can be characterized as essentially linear, segmented, aliphatic polyurethane elastomers. This family of polymers, being aliphatic and polyether-based with 100% urethane linkages in the molecular backbone, exhibit superior flexural life, outstanding hydrolytic stability, and a high degree of blood compatibility. In addition to the foregoing, the polymers can be pelletized and extruded to form a variety of shaped devices such as cardiac pacemaker leads, blood bags, catheters and I.V. tubing. This unusual combination of properties make this family of polymers useful in devices requiring blood contact surfaces.

It is therefore an object of this invention to provide an extrudable material suitable for use in forming devices that require a high degree of blood compatility.

BRIEF DESCRIPTION OF THE DRAWING

The sole FIGURE of the drawing is a diagram illustrating the process for extruding articles from the elastomer of the present invention.

DESCRIPTION OF THE PREFERRED EMBODIMENT

At the outset, the invention is described in its broadest overall aspects with a more detailed description following. The polyurethane elastomer of the present invention is a rubbery reaction product of aliphatic organic diisocyanates, high molecular weight polyether polyols and a specific low molecular weight glycol (chain extender). The low molecular weight glycol is 1,4 butane diol.

In addtion to the foregoing required constituents, the reaction constituents preferably includes a catalyst and optionally an antioxidant and a lubricant for extrusion.

In general, polyurethane polymers are the condensation product of reactions between diisocyanates and compounds containing active hydrogen sites such as hydroxyl groups.

A diisocyanate is an isocyanate compound having a functionality of two. The polymerization takes place in the presence of a difunctional hydroxyl compound (this can be either a simple glycol or a macromolecular glycol).

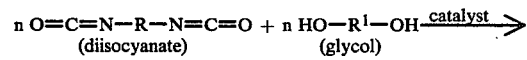

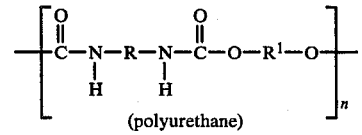

Examples of aliphatic diisocyanates useful in this invention are: hexamethylene diisocyanate (HDI), $OCN(CH_2)_6NCO$;

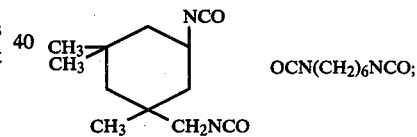

isophorone diisocyanate (IPDI);

tri methyl hexamethylene diisocyanate (TMHDI), $$OCN-CH_2-\underset{\underset{CH_3}{|}}{\overset{\overset{CH_3}{|}}{C}}-CH_2-\underset{\underset{CH_3}{|}}{CH}-CH_2-CH_2-NCO;$$

dicylohexyl methane diisocyanate (HMDI),

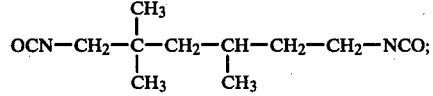

$CH_2(C_6H_{10}NCO)_2$, and dimer acid diisocyanate (DDI)

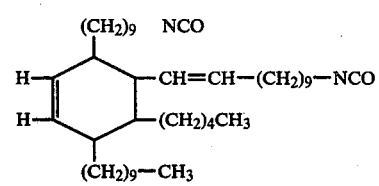

The preferred diisocyanate for forming polymers in accordance with this invention is dicyclohexyl methane diisocyanate (HMDI).

Although a number of aliphatic diisocyanates can be utilized in preparing a polymer in accordance with the present invention, numerous tests have indicated that the selection of the high molecular weight polyol is limited to poly tetra methylene ether glycol (PTMEG) H—(O—CH$_2$—CH$_2$—CH$_2$—CH$_2$)$_n$—OH. Stated another way, this high molecular polyol is the only polyol which has been found to produce a polyurethane which is hemocompatible and possesses the other properties discussed above. In general, this glycol should have an average molecular weight between about 500 and 5000, preferably between 1000 and 3000. In the preferred embodiment of this invention PTMEG having a molecular weight of 2000 is utilized.

As was stated above, the chain extender for the polymer of the present invention is 1,4 butane diol (HO—CH$_2$—CH$_2$—CH$_2$—CH$_2$—OH).

The preferred polyurethane has the following structural formula:

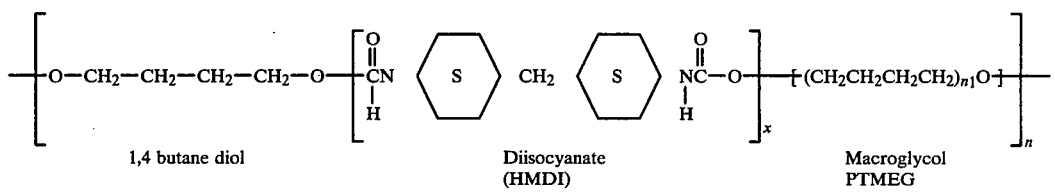

1,4 butane diol    Diisocyanate (HMDI)    Macroglycol PTMEG where n, is an integer selected to give a molecular weight between 500–5000, x is an integer from 1 to 5, and n is an integer selected to give a number average molecular weight of 120,000 units, and a weight average molecular weight of 315,000 molecular weight units.

As can be seen from the above formula, the polymer of the present invention is composed of three repeating units, the diol, the diisocyanate and the macroglycol. The relationship of these repeating units to each other is determined by the physical characteristics desired. For example, for tubing which should be soft and elastomeric (70 Shore A), for each diol there are two diisocyanate repeating units and one macroglycol. To produce harder material, the ratio of diol to diisocyanate and macroglycol can be increased thereby resulting in a harder material. For example, for catheters (50 Shore D) two butane diol units are repeated for each isocyanate and each macroglycol.

The reactants are provided in approximately the molar amounts necessary to produce the foregoing polymer.

To obtain fully cured polyurethane castings in a reasonably short period of time, it is customary to incorporate into the mixture a suitable catalyst to promote the polymerization reaction. Suitable catalysts inclue N-methyl morpholine, trimethyl amine, triethyl amine, zinc octoate, dibutyl tin dilaurate and dioctyl tin dilaurate. Dioctyl tin dilaurate is the preferred catalyst.

The process in accordance with the present invention is represented diagrammatically in the sole FIGURE of the drawing.

The polyurethane is prepared from two components which can be referred to as part A and part B. Part A is the aliphatic diisocyanate. Part B is comprised of the other constituents: a macroglycol (the polyether base), the low moleuclar weight chain extender, the catalyst, the antioxidant and the lubricant. Of course the catalyst, antioxidant and lubricant do not combine chemically as part of the polymer.

To form a polyurethane element, the proper stoichiometric proportions of part A and part B are emulsified by a mixer at room temperature to form a moderately reactive thixotropic mixture having a viscocity below about 2500 cps.

Since the emulsification introduces air into the reactive mixture, the air must be removed. The air bubbles are removed by placing a vessel containing the emulsion under a bell jar and evacuating the air from the bell jar with a suction device. The bell jar is evacuated to a pressure of about 0.3 microns and the mixture is kept under the bell jar about 8 minutes causing the mixture to appear to boil. After the emulsion is taken from the bell jar, it is allowed to stand until the exothermic reaction that is taking place brings it to a temperature of about 40° C.

At this point, the emulsion is preferably poured into a pan where it is allowed to flow to form uncured sheets.

The pan with the sheets is then placed in an oven and heated at a temperature of at least 110° C. for four hours or more until the elastomer is cured. The sheets are then chopped up or pelletized in a standard pelletizer resulting in pellets approximately ¼ inch in length. These pellets are then used in machinery suitable for an extrusion of the desired product.

In an optional embodiment of the invention, it is also possible to dissolve the pellets in a solvent such as dimethyl acetamide, tetrahydrofuran, 1,4 dioxane and m-pyrrol. The solution can then be used to make an article by the solvent casting method.

The invention is further illustrated by the following non-limiting example.

67.75 grams of dicyclohexyl methane diisocyanate (HMDI) was reacted with a mixture of the following five constituents: 229.2 grams of 2000 molecular weight poly tetra methylene ether glycol, 12.35 grams of 1,4, butane diol. This reaction mixture also contained 3.0 grams of a anti-oxidant. The anti-oxidant used is sold under the trade name IRGANOX 1010 by Ceiba Geigy. The chemical name of the anti-oxidant is tetrakis [methylene (3,5-di-tert-butyl-4-hydroxyhydrocinnamate)] methane. Also included in this reaction mixture was 0.5 grams of a lubricant sold under the trade name of GLYCOLUBE VL obtained from the Glyco Chemical Company of New York. 0.006 grams of a tin-based catalyst sold by Cosan Chemical Corporation of Carlstadt, New Jersey under their trade name COTIN 430 was also included.

The above constituents were mixed with the HMDI, deaerated until all entrained gases were removed. The mixture was then cured at 110° C. for three hours under a nitrogen atmosphere in the form of sheets. The sheets were then chopped up in the standard pelletizer to form pellets suitable for extrusion. The physical properties of the cured elastomer was as follows: tensile stength 4500 psi minimum, elongation 650%, hardness (Shore A) 70–75.

The pellets were then processed in a laboratory extruder. Processing conditions were determined on a 1" diameter, 24/1 general purpose screw, as shown below:
Rear °F.: 300
Middle °F.: 320
Front °F.: 320
Die: 330
Throat: Water cooling Tubing, in sizes appropriate for use in pacemaker leads, was extruded. The tubing exhibited all the desirable physical characteristics required in these applications.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A polyurethane polymer to be used in molding devices for use in the human body and requiring a high degree of blood compatibility, said polymer being a polyurethane elastomer and the reaction product of:
   (a) dicyclohexyl methane diisocyanate;
   (b) a polytetramethylene ether polyol having a molecular weight in the range of 1000–2000; and
   (c) 1,4 butane diol, wherein for each diol there are two dicyclohexyl methane diisocyanates and one glycol; and
the average molecular weight of the polymer is 120,000 units, and a weight average molecular weight of 315,000 molecular weight units.

* * * * *